(12) United States Patent
Hisatomi

(10) Patent No.: US 7,077,586 B2
(45) Date of Patent: Jul. 18, 2006

(54) PRINTING APPARATUS, CONTENT OUTPUT APPARATUS, AND PRINTING SYSTEM

(75) Inventor: Kenji Hisatomi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/487,275

(22) PCT Filed: Aug. 30, 2002

(86) PCT No.: PCT/JP02/08849

§ 371 (c)(1),
(2), (4) Date: Feb. 20, 2004

(87) PCT Pub. No.: WO03/019348

PCT Pub. Date: Mar. 6, 2003

(65) Prior Publication Data

US 2004/0240919 A1 Dec. 2, 2004

(30) Foreign Application Priority Data

Aug. 30, 2001 (JP) .................................. 2001-260748

(51) Int. Cl.
*B41J 11/44* (2006.01)
*B41J 5/30* (2006.01)

(52) U.S. Cl. .................................... 400/76; 400/61
(58) Field of Classification Search .................. 400/76, 400/61, 70; 348/552; 358/1.13, 1.9, 1.14
See application file for complete search history.

(56) References Cited

U.S. PATENT DOCUMENTS

| 5,539,523 A | * | 7/1996 | Nakai et al. | 358/296 |
| 5,731,830 A | * | 3/1998 | Masuda | 347/112 |
| 5,787,414 A | * | 7/1998 | Miike et al. | 707/2 |
| 5,805,295 A | * | 9/1998 | Mikami | 358/3.1 |

(Continued)

FOREIGN PATENT DOCUMENTS

| JP | 03-248262 | 11/1991 |
| JP | 05-183674 | 7/1993 |
| JP | 09-081763 | 3/1997 |
| JP | 10-143403 | 5/1998 |
| JP | 10-336557 | 12/1998 |
| JP | 11-245455 | 9/1999 |
| JP | 11-316672 | 11/1999 |
| JP | 2000-222330 | 8/2000 |
| JP | 2001-195391 | 7/2001 |
| JP | 2001-202212 | 7/2001 |
| JP | 2001-218139 | 8/2001 |
| JP | 2001-228857 | 8/2001 |

*Primary Examiner*—Andrew H. Hirshgeld
*Assistant Examiner*—Wasseem H. Hamdan
(74) *Attorney, Agent, or Firm*—Wenderoth, Lind & Ponack, L.L.P.

(57) ABSTRACT

When a print instruction is made by a user who is watching a digital television or the like, a printer makes a send request for print data necessary for printing the first page to a set top box (STB) and receives "Sample.bml" from the STB. Next, the printer refers to the contents written in "Sample. bml", and specifies image data whose vertical and horizontal sizes are unknown. Next, the printer makes a send request for the vertical and horizontal sizes of an image data whose vertical and horizontal sizes are unknown (such as "B.jpg") to the STB, and receives the vertical and horizontal sizes from the STB. Further, the printer obtains actual image data from the STB after performing the layout for printing based on the received vertical and horizontal sizes and executes printing page by page.

19 Claims, 15 Drawing Sheets

U.S. PATENT DOCUMENTS

| | | | |
|---|---|---|---|
| 5,832,126 A | 11/1998 | Tanaka | 382/239 |
| 6,108,105 A * | 8/2000 | Takeuchi et al. | 358/1.2 |
| 6,266,128 B1 | 7/2001 | Yoshida et al. | 355/40 |
| 6,304,335 B1 * | 10/2001 | Furuya et al. | 358/1.15 |
| 6,370,536 B1 | 4/2002 | Suzuki et al. | 707/101 |
| 6,545,747 B1 | 4/2003 | Yoshida et al. | 355/54 |
| 6,563,596 B1 * | 5/2003 | Narushima | 358/1.14 |
| 6,633,410 B1 * | 10/2003 | Narushima | 358/1.9 |
| 6,633,887 B1 | 10/2003 | Suzuki et al. | 707/102 |
| 6,636,902 B1 | 10/2003 | Ihara | 710/5 |
| 6,710,892 B1 * | 3/2004 | Narushima | 358/1.13 |
| 6,731,407 B1 * | 5/2004 | Hayama | 358/3.2 |
| 6,774,951 B1 * | 8/2004 | Narushima | 348/552 |
| 6,791,714 B1 * | 9/2004 | Ishimura | 358/1.9 |
| 6,807,633 B1 * | 10/2004 | Pavlik | 713/710 |
| 2002/0049766 A1 | 4/2002 | Suzuki et al. | 707/104.1 |
| 2002/0083047 A1 | 6/2002 | Suzuki et al. | 707/1 |

* cited by examiner

Fig. 8

| File name | File size | Vertical image size | Horizontal image size |
|---|---|---|---|
| A.jpg | 40KB | 200pixel | 500pixel |
| B.jpg | 143KB | 900pixel | 500pixel |
| sample.bml | 7KB | - | - |

Fig. 9

| Page number | File number | File location |
|---|---|---|
| 1 | A.jpg | 1~40KB |
| 1 | B.jpg | 1~48KB |
| 2 | B.jpg | 49~143KB |

Fig. 10

| Buffer name | Buffer size |
|---|---|
| Input file buffer (203a) | 110KB |
| Decompression buffer (203b) | 220KB |
| OI buffer (203c) | 1MB |
| Print image data buffer (203d) | 1MB |

PRINTING APPARATUS, CONTENT OUTPUT APPARATUS, AND PRINTING SYSTEM

TECHNICAL FIELD

This present invention relates to an apparatus and the like for printing documents and images, especially a printing technology and a printing method used when printing documents and images displayed on a digital television and the like.

BACKGROUND ART

Conventionally, when printing data to be printed (means "print data" from here) showing a document to be printed (such as an Extensible Markup Language (XML) document contains an image) using a printer connected to a personal computer (abbreviated as "PC" from here), printing is performed by representing print data using a control language (such as Page Description Language) for a PC, then transforming it to an object image (abbreviated as "OI" from here) with the descriptions of the image data, further transforming the transformed OI to a print image data, and processing the print image data using a printer.

FIG. 1 is a diagram showing the process of making the print image data from a file represented using a control language in the case of the above-mentioned conventional printing. As shown in FIG. 1, first, a file to which information on a page written in a control language is added for all the print data, next, page by page data necessary for printing in the file is sent. The printer prints based on the received data. In this case, all the data of text data, image data and the like in the document are written in a control language.

Conventional printers are made without considering the case where printing is performed by connecting to a device (such as an set top box (STB) of a digital television) that does not have the function for transforming print data to a file written in a control language unlike a PC while they have the function for receiving data sent from outside. More specifically, a screen display of a digital broadcasting program displayed on a digital television screen comprises a plurality of files, that is, a BML file contains the component information of the screen display, a JPEG (Joint Photographic Experts Group being an image compression standard) file and an AAC (Advanced Audio Coding being an audio compression standard) file which are components of a display screen and the like, which means that a printer must receive data (such as a BML file or a JPEG file) that is sent from an STB and the like as it is before transforming the data to a file written in a control language, and perform transformation processing that is performed conventionally by a PC when performing printing by connecting a printer to a device such as this distal television. Therefore, the processing load necessary for such as a transformation processing in the printer increases and the needed memory capacity at the time of printing also increases, which results in a drawback of high cost and the like.

Therefore, this present invention is made considering the above-mentioned problems and its aim is providing a printing apparatus, a content output apparatus and a printing system operable to transform a BML file, a JPEG file or the like into a file written in a control language while the processing is conventionally performed by a PC, and further, transform the file written in a control language into an OI more efficiently while the processing is conventionally performed by a printer using a smaller memory capacity.

SUMMARY OF THE INVENTION

In order to achieve the above-mentioned aim, the printing apparatus in the present invention is connectable to a content storage device that stores contents containing an image, and comprises a data obtainment unit operable to obtain a part or all of the contents, a size extraction unit operable to extract the vertical and horizontal sizes of an image from the obtained data, a layout unit operable to lay out the image for printing using the extracted vertical and horizontal sizes of the image, an image obtainment unit operable to request the content storage apparatus for the image data and obtain the image data based on the layout, and a printing unit operable to generate and print out a print image data based on the obtained image data and layout.

FIG. 2 is a diagram showing the process from representing the print data printed by the printing apparatus in the present invention in a control language to making an OI. As shown in FIG. 2, when it is compared with the above-mentioned FIG. 1, it is possible to save the memory capacity in the printer because a file in which image data is stored is written as link information in the file written in a control language. In this case, if a need arises, the image data is decompressed based on the link information and the vertical and horizontal sizes of the image.

In this way, as an OI of image data is made by a direct access to the image data as a need arises, it becomes no need to write the data corresponding to the image data in the file written in a control language, and thus it becomes possible to prevent doubly storing the received image data and the after-transformation data written in a control language. Also, it is possible to perform printing processing efficiently using the memory of the printer without putting heavy load on an STB.

Note that, the present invention is realized not only as the above-mentioned printing apparatus, but also as a printing method regarding the unique units of the above-mentioned printing apparatuses as steps or as a program operable to have a computer such as a PC execute these steps. It is needless to say that it is possible to distribute such a program using a storage medium such as a CD-ROM or via a communication medium such as the Internet.

FURTHER INFORMATION ABOUT TECHNICAL BACKGROUND TO THIS APPLICATION

Japanese Patent application No. 2001-260748 filed Aug. 30, 2001, is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 8 is a diagram showing an example of structure information data for respective print data files in the first embodiment.

FIG. 9 is a block diagram showing an example of structure information data concerning the print data for respective pages in the first embodiment.

FIG. 10 is a diagram showing an example of each buffer capacity in the storage unit of the printer in the first embodiment.

BEST MODE FOR CARRYING OUT THE INVENTION

Further explanations on embodiments in the present invention will be made below with reference to figures.
(First Embodiment)

Figure 1:
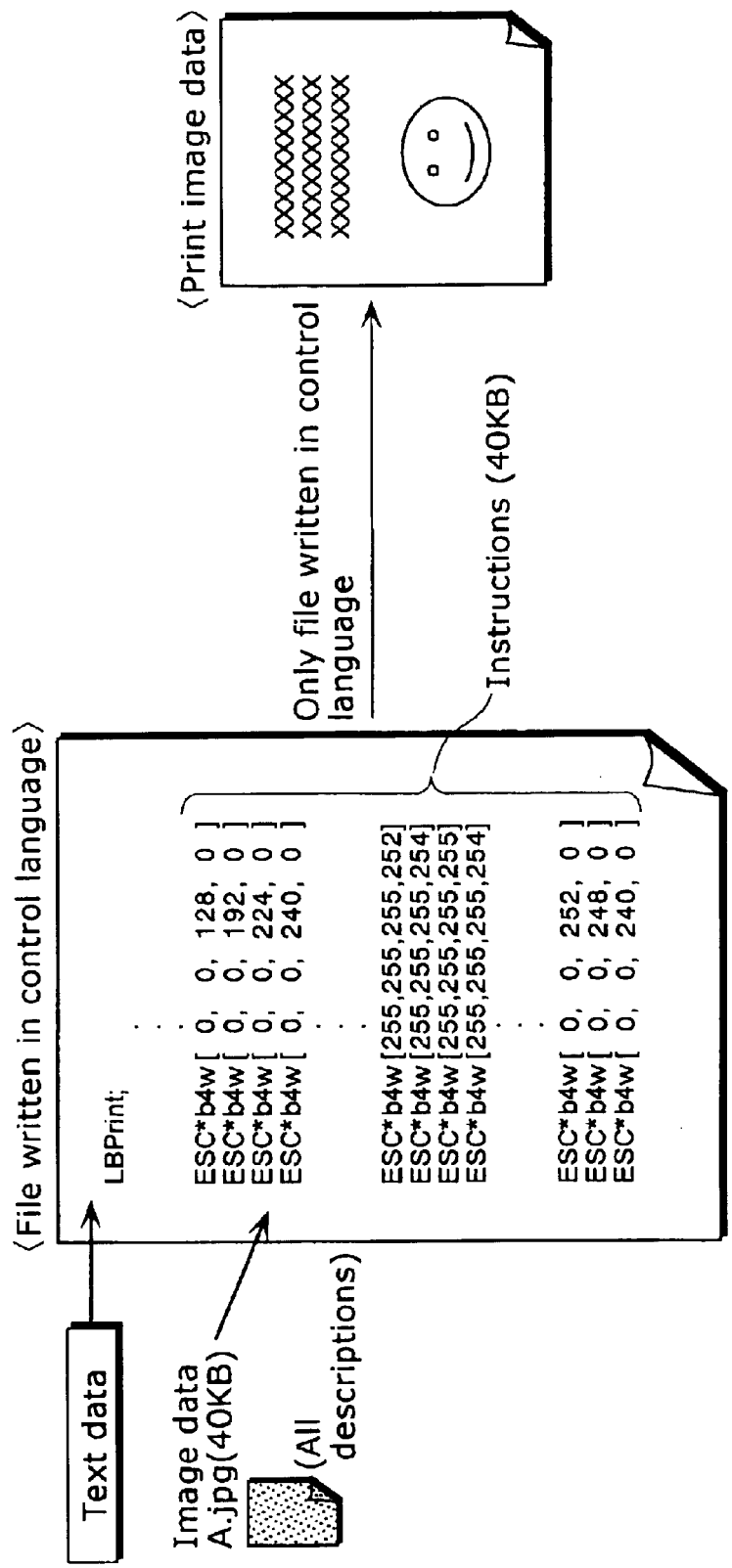
FIG. 1 is a diagram showing the process in which a file represented using a control language is transformed to print image data in conventional printing.
Figure 2:
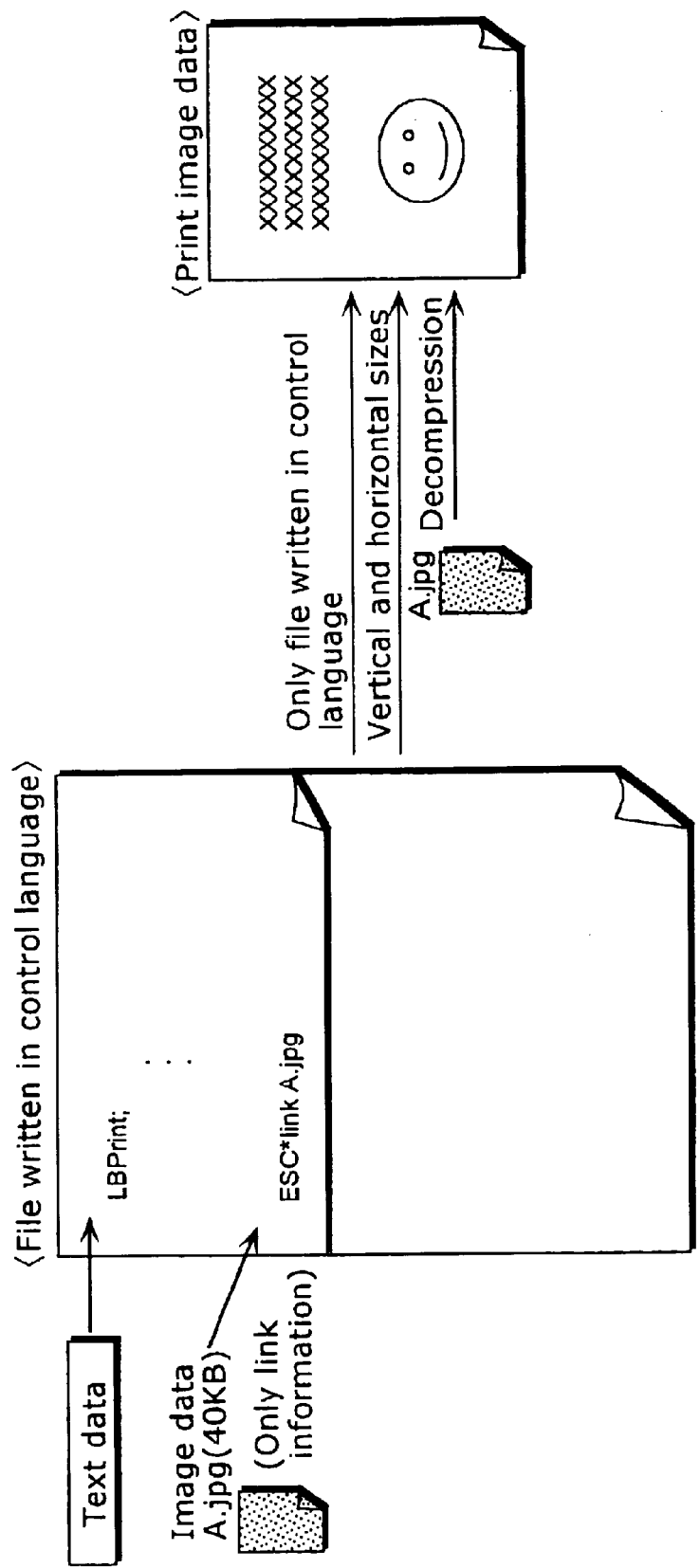
FIG. 2 is a diagram showing the process in which a file represented using a control language is transformed to print image data in printing in a first embodiment.
Figure 3:
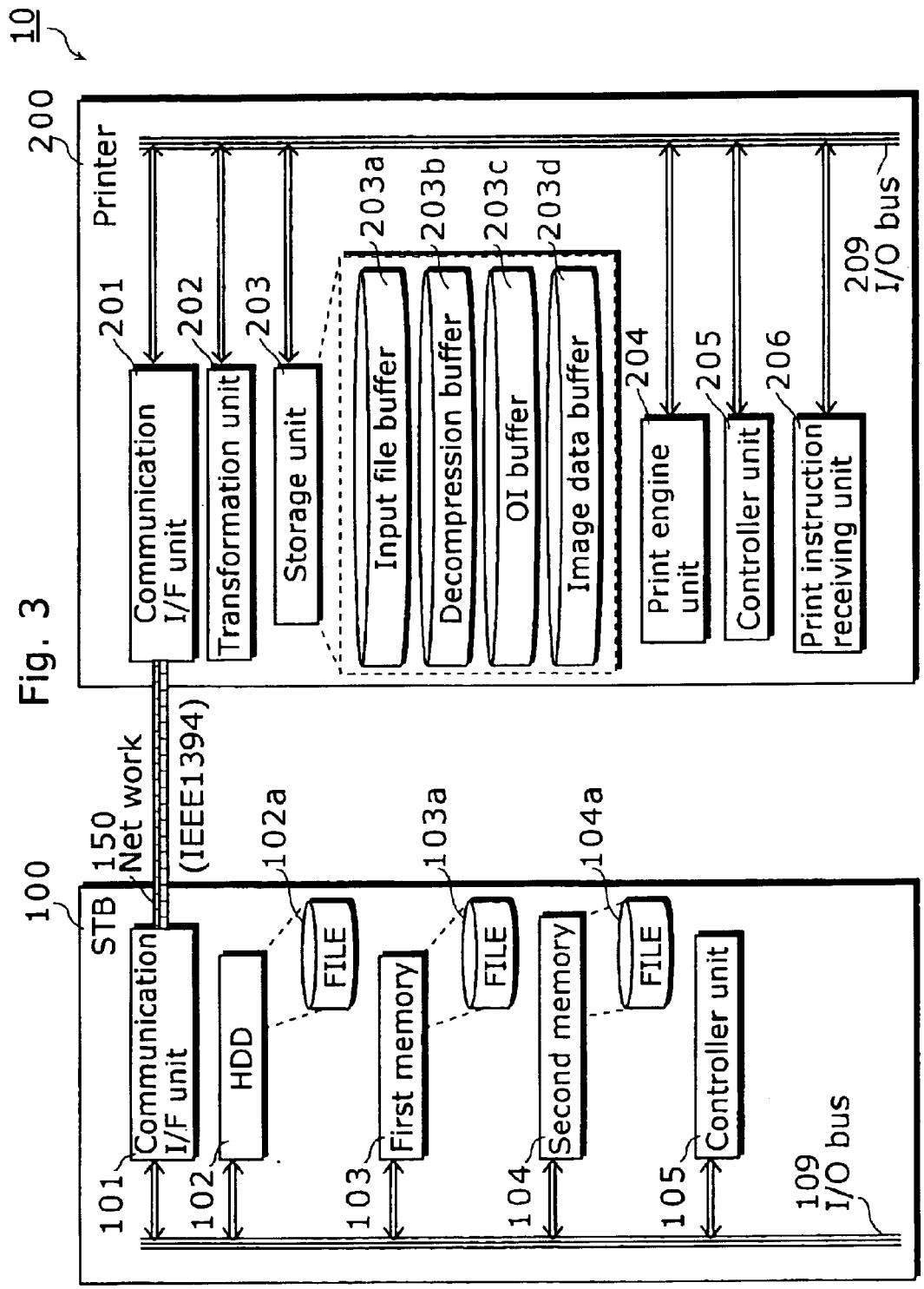
FIG. 3 is a block diagram showing the functional structure of an STB and a printer which comprise the printing system in the first embodiment.

FIG. 3 is a diagram showing the functional structures of an STB 100 and a printer 200 which comprise the printing system 10 in this embodiment.

The STB 100 is a tuner terminal of a digital television broadcasting, and it comprises a communication I/F unit 101 operable to input and output data when communicating with a printer 200, an HDD 102 operable to store program contents of digital television broadcasting and the like, the first memory 103 operable to store the data of a program on air or before broadcasting (more specifically, before displaying the data on the screen display of a digital television and the like), the second memory 104 operable to save the data stored in this first memory 103, a controller unit 105 operable to control the above-mentioned respective units and so on. Further, each unit of the STB 100 is connected to each other by an I/O bus 109.

The reason why the STB 100 comprises the second memory 104 is as follows: for example, in the case of digital television broadcasting, as the data of a program that is already broadcast is usually stored only in the first memory 103 in the STB 100, the data is deleted when switching programs or the program finishes unless an explicit store instruction is made by a user. Besides, if it receives a print instruction from a user during the on-air time, in the case that the program is switched or finished before its printing completes, the data expected to be printed is deleted in the first memory 103 of the STB 100 and thus there emerges a problem that it is impossible to complete printing. In order to solve this problem, the second memory 104 is prepared so as to save the data necessary expected to be printed unless there is an explicit delete instruction or the like. Of course, when the data for printing exists in the first memory 103, it is also possible to send the data from the first memory 103 to the printer 200. In other words, any one of an HDD 102 in the STB 100, a printer 200, an external storage medium connected to the STB 100 and the like is available when saving the above-mentioned data, and it is also possible to send from the first memory 103 when the necessary print data can be stored in the first memory 103 without the second memory 104.

The printer 200 is a printer that is so-called "PULL" type, and actively obtains necessary data from the STB 100 when receiving a print instruction notification from the STB 100 and the like. The printer 200 comprises a communication I/F unit 201 operable to input and output data when communicating with the STB 100, a storage unit 203 operable to store data received from the STB 100 or print image data or the like that are made during the printing process, a transformation unit 202 operable to control transformation from the received data to a file written in a control language or respective images generated by executing respective instructions written in a file in a control language (object image: OI) to respective print image data, a print engine unit 204 operable to draw text or images on a paper and the like based on print image data, a print instruction receiving unit 206 operable to receive a print instruction from a user via the STB 100, a controller 205 operable to control the above-mentioned respective units and the like. In addition, each unit of the printer 200 is connected to an I/O bus 209. An object image has information on location in the whole page along with being a small piece of image.

Also, the print instruction reception unit 206 can also receive a print instruction via, for example, a remote controller of a digital television and the like excluding the above-mentioned STB 100.

Further, the storage unit 203 comprises an input file buffer 203a operable to store data received from an STB 100, a decompression buffer 203b operable to decompress data stored in the input file buffer 203a to a file written in a control language, an OI buffer 203c operable to store object images when executing a file written in a control language, and an image data buffer 203d operable to store print image data made by synthesizing respective object images.

Also, the STB 100 is connected with the printer 200 via serial connection such as the IEEE 1394. Any one of the IEEE 1394, a USB, and the like is available when connecting the STB 100 with the printer 200. The printer 200 is, for example, a printer like an inkjet printer or a laser printer, or a facsimile apparatus, a copy machine and the like.

Figure 4:
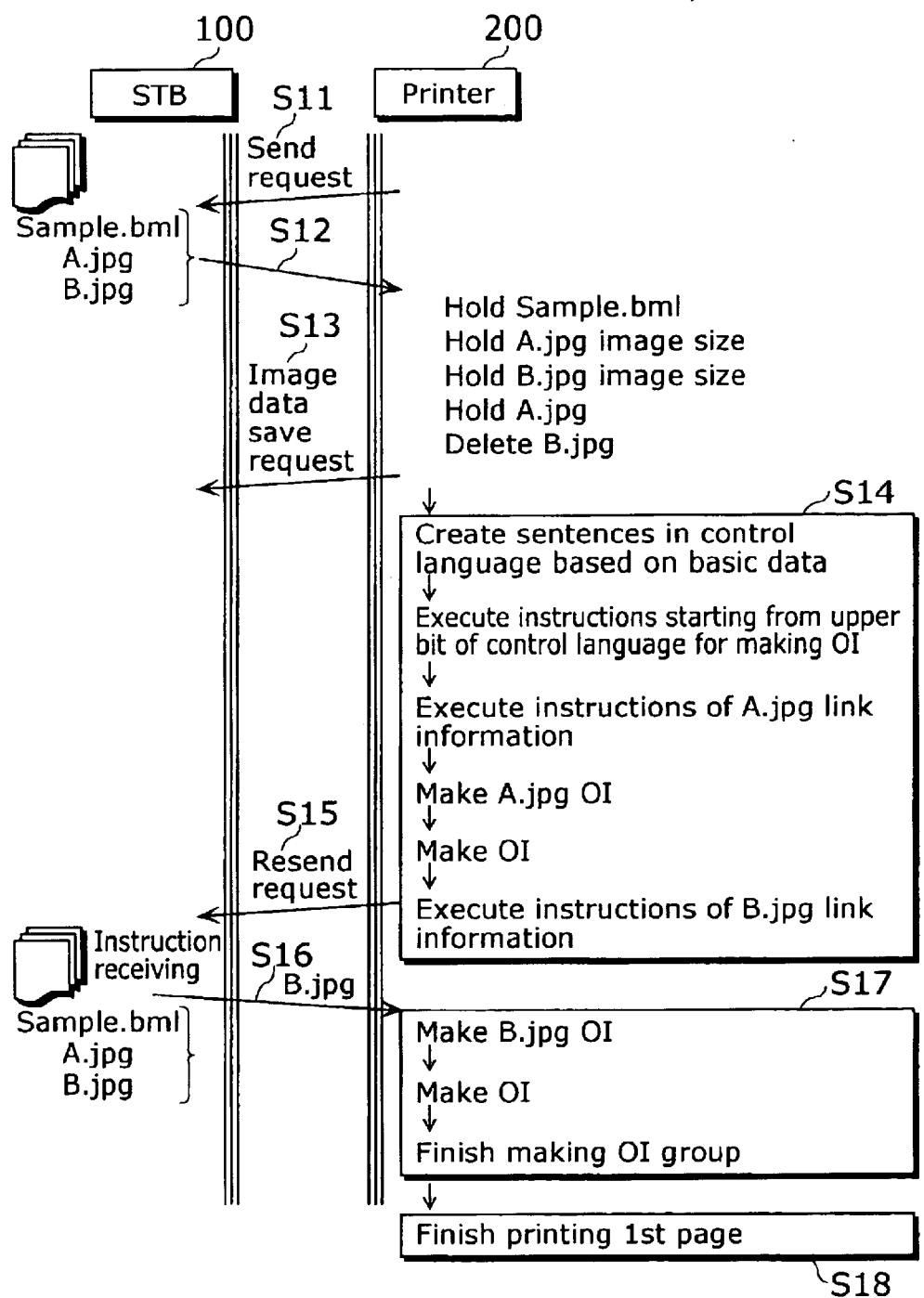
FIG. 4 is a communication sequence diagram showing the data communication between the STB and the printer in the first embodiment.

Next, explanation on data communication when printing in the printing system 10 will be made. FIG. 4 is a communication sequence that shows data communication between the STB 100 and the printer 200. In FIG. 4, it is assumed that there is a print instruction from a user for printing "the first page" shown in the later-explained FIG. 6. Print data in FIG. 4 is composed of a group of broadcasting program files made of "Sample. bml", "A. jpg", and "B. jpg". Document structure of respective image data files (file size, the vertical and horizontal sizes of images and so on), places in which an image data file is stored (link destinations) are written in "Sample. bml". "A. jpg" and "B. jpg" are image data (for example, a JPEG file with a header part and a body part) of images that constitutes a screen display. In this embodiment, the contents of the print data and so on are not manipulated (for example, without changing color information), and printed as they are.

First, the printer 200 (the print instruction receiving unit 206) receives a print instruction from a user via the STB 100 and the like. In this way, the printer 200 notifies the STB 100 of a print data send instruction (S11). After that, the printer 200 receives print data sent from the STB 100 (S12), and tries to store the received data in the input file buffer 203a of the printer 200.

Here, a controller unit 205 judges whether the input file buffer 203a has the capacity for storing all the received print data. When the judgment is yes, in other words, when it is judged that the size of print data is smaller than that of the input file buffer 203a of the printer 200, the transformation unit 202 starts to pre-printing processing (that is, layout processing for printing).

On the other hand, when it is judged that the print data to be received cannot be completely stored in the input file buffer 203a, the controller unit 205 issues a save request from the printer 200 to the STB 100 so as to store the whole print data tried to be received in the STB 100 (S13), and control the communication I/F unit 201 so as to save the concerning data in the second memory 104 in the STB 100. The reason why the data is saved is, as mentioned above, to prevent an in-process printing from terminating because of a program's completion or the like.

Note that it is also possible to save the concerning data in the second memory 104 triggered by a print instruction, regardless of whether it is possible to store the data in the input file buffer 203a or not when it is specified in advance that the STB 100 executes a pull-type communication with the printer 200 in its specification and the like.

Here, the sizes of the respective buffers in the storage unit 203 are shown in FIG. 10. Whether the printer 200 is capable of storing the print data to be received from the STB 100 completely in the input file buffer 203a is judged by receiving data that indicates the size of print data, that is, 190 KB in total of 7 KB for "Sample. bml", 40 KB for "A. jpg", and 143 KB for "B. jpg" and then comparing the size with 110 KB, that is, the size of the input file buffer 203a in controller unit 205. In the case of this embodiment, the controller unit 205 judges that it is impossible to store the whole print data by referring to the contents of FIG. 10 because the data amount of the print data is larger than 110 KB, that is, the capacity of the input file buffer 203a.

It is also possible to calculate the data size of the print data to be received in the printer 200 side (for example, the controller 205) without receiving the information that shows the size of the print data from the STB 100.

As to the above-mentioned "Sample. bml", providing that the "Sample. bml" is held in the input file buffer 203a after received until its printing finishes (in other words, providing that it is not deleted until its printing finishes), it is possible to start the above-mentioned transformation processing and the like immediately without receiving the print data even when printing the pages starting from the second page.

Figure 6:
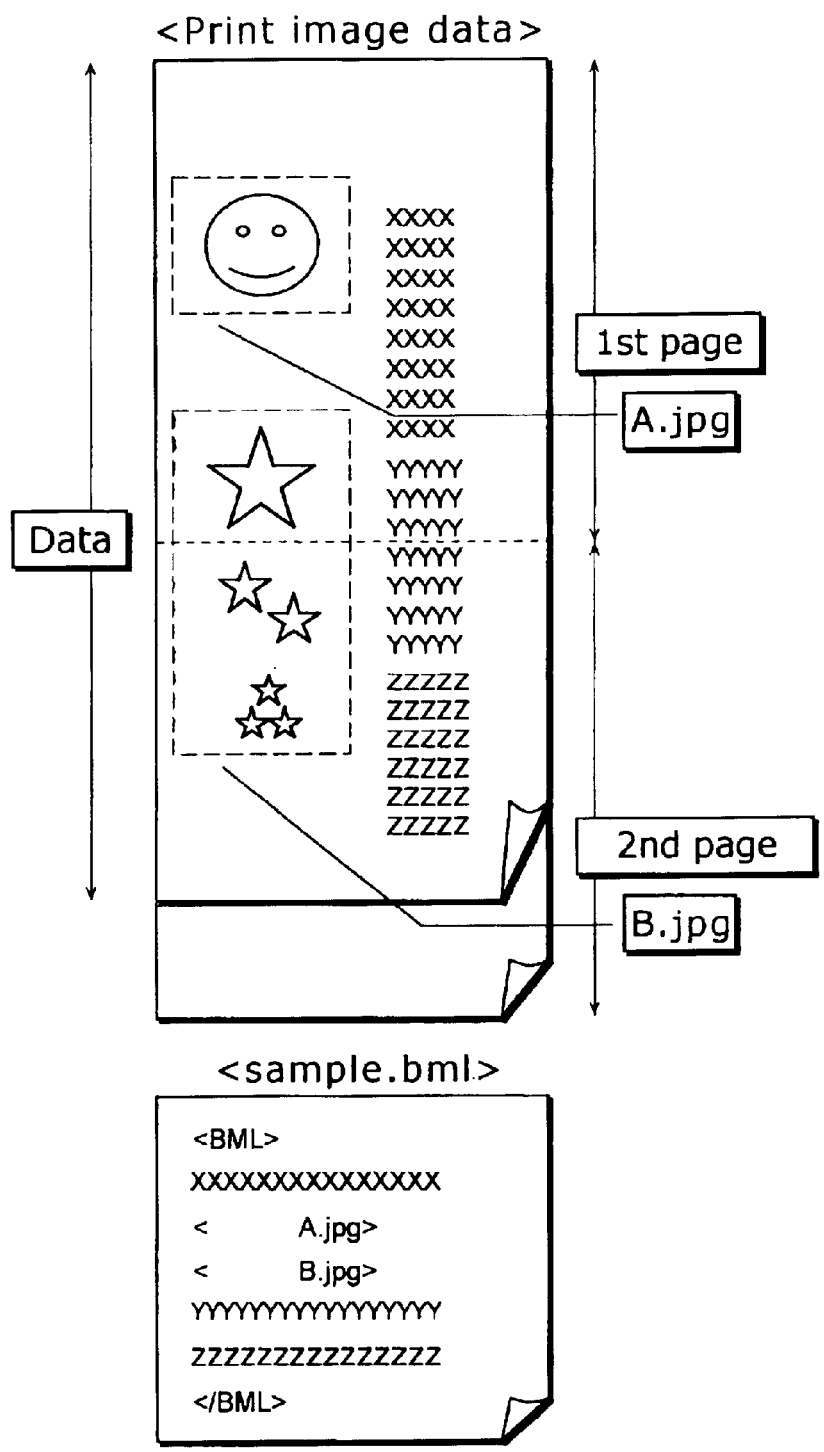
FIG. 6 is a diagram showing the print image using the print data in the first embodiment.

Here, the printing processing when it is impossible to store the whole print data in the input file buffer 203a at one time will be explained more specifically with reference to FIG. 6. The input file buffer 203a can store "Sample. bml" and "A. jpg" but cannot store "B. jpg". However, "B. jpg" is necessary for printing the first page. In addition, as the component information of the file as a standard (such as the vertical and horizontal sizes of the display screen and the like) is necessary for making a file written in a control language as a stage before making print image data, the input file buffer 203a in the printer 200 should hold the vertical and horizontal sizes of the image of "Sample. bml", "A. jpg", and "B. jpg" until printing finishes.

Generally, these vertical and horizontal sizes of the images are gotten by reading the information on these vertical and horizontal sizes written in the header part and the like of the image data. More specifically, information shown in FIG. 8 is stored in the input file buffer 203a and the like. The vertical and horizontal sizes of images can be received from the STB 100 or calculated in the printer 200 (for example, the controller unit 205).

Further, the STB 100 may store the vertical and horizontal sizes of the image data in advance in "Sample. bml", and then function to send the data to the printer 200. It is also possible to perform image enlarge or shrink processing based on the vertical and horizontal sizes of these images when executing printing processing.

The above-mentioned pre-printing processing will be explained below.

First, information showing that the vertical size of the image "A. jpg" is 200 [pixel] and the horizontal size is 500 [pixel] is gotten from the data stored in the input file buffer 203a such as the component information stored in "A. jpg", and "Sample. bml" in FIG. 8 (more specifically, information shown in the table as FIG. 8), and the input file is transformed into a file written in a control language by the transformation unit 202 and decompressed in the decompression buffer 203b. While the data including the image data are conventionally written as statements when transforming data that contains image data into a file written in a control language, only statement specifying the file name of the image data is written instead of the descriptions of the image data as statements when the data is transformed into a file written in a control language in this embodiment because image data is not always stored in the input file buffer 203a. This method is especially effective when there is no need to print all the pages of image data that requires plural pages. Also, a file written in a control language is made for all the respective pages, and the number of pages in total can be grasped when these files written in a control language are made.

Figure 7:
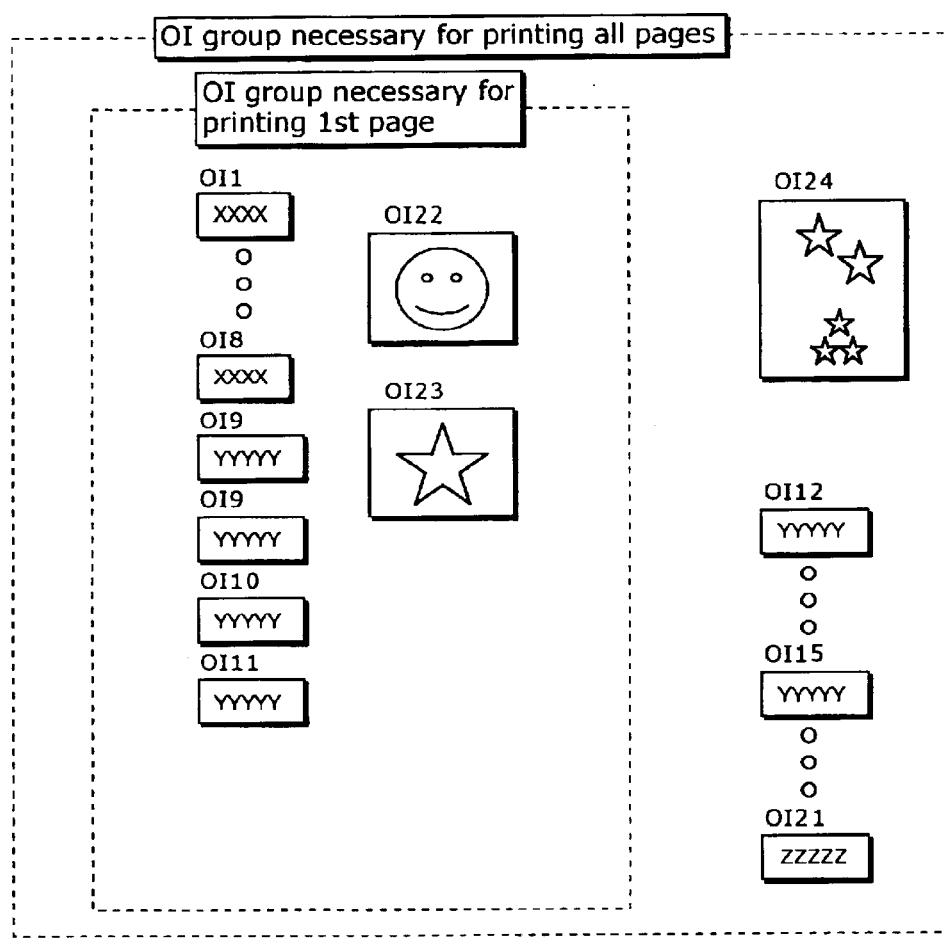
FIG. 7 is a diagram showing the group of object images necessary for all pages when printing using the print data in the first embodiment.

When these files written in a control language are made in the decompression buffer 203b by the transformation unit 202, respective instructions written in a control language are executed in order by the transformation unit 202 so as to decompress the object images in the first page in the OI buffer 203c. FIG. 7 is a diagram showing the object images to be displayed in the OI buffer 203c. When the transformation unit 202 executes instructions starting from the one written in the first line of the file and the stage has come in which the instruction for making object images of "A. jpg" in the OI buffer 203c is executed, and the transformation unit 202 confirms the data stored in the input file buffer 203a. Then the transformation unit 202 makes object images in the OI buffer 203c using "A. jpg" because "A. jpg" itself is stored in the input file buffer 203a. After this processing, the transformation unit 202 further executes the instruction for making object images of "B. jpg" in the OI buffer 203c. However, the transformation unit 202 has to obtain "B. jpg" in advance from the STB 100 unlike in the case of "A. jpg" because "B. jpg" does not exist in the input file buffer 203a.

Therefore, the printer 200 makes a resend request for "B. jpg" to the STB 100. As "B. jpg" is sent as a group of files of the print data from the second memory 104 in the STB 100, "B. jpg" is overwritten in a memory space in which necessary data, that is, "A. jpg" is stored. "B. jpg" can be stored in the input file buffer 203a by overwriting the data on the file that has already processed and becomes useless, or by writing the data after deleting the previously stored file. If image data requires plural pages as shown in FIG. 6, only storing the number of byte necessary for constituting one page is needed. In practical, as it is possible to specify which part of the "B. jpg" is the first page when making files written in a control language, it becomes possible to use the number of bytes of the first page of "B. jpg" when performing printing processing of the following page by storing the data separately as shown in FIG. 9. When "B. jpg" is stored in the input file buffer 203a, the instruction for making object images of "B. jpg" in the OI buffer 203c is executed.

This embodiment is a case where "A. jpg" and "B. jpg" are aligned vertically and "B. jpg" is processed after "A. jpg", but it is possible to execute OI making processing regardless of the locations of images because image data are processed one by one in the order of having been written in a control language regardless of image locations.

FIG. 7 is for specifying object images made in this way. The print image data for the first page is made in the image data buffer 203d by the transformation unit 202 using these object images that stores location information. The state of the print image data to be decompressed in the image data buffer 203d will be shown in FIG. 6. The print engine unit 204 of the printer 200 executes printing using these image data.

Judgment on whether the second page should be printed or not after the first page is printed is on hold until a user gives an instruction. When a user gives an instruction for executing printing the second page, the printing processing is continued. Data when making the first page, that is, files written in a control language corresponding to all of the respective pages have already stored, more specifically in the decompression buffer 203b. Therefore, the second page is processed considering the processing of the first page.

There is a need to make object images considering files written in a control language for the first page so as to print the second page. There is a need to obtain these data so as to make object images of the second page because there is no data on the latter part of "B. jpg". The rest of the "B. jpg" data should be stored in the input file buffer 203a based on the number of bytes of "B. jpg" obtained when receiving "B. jpg" in the first page. The processing for making the following print image data is the same as the processing for the first page.

Figure 5:
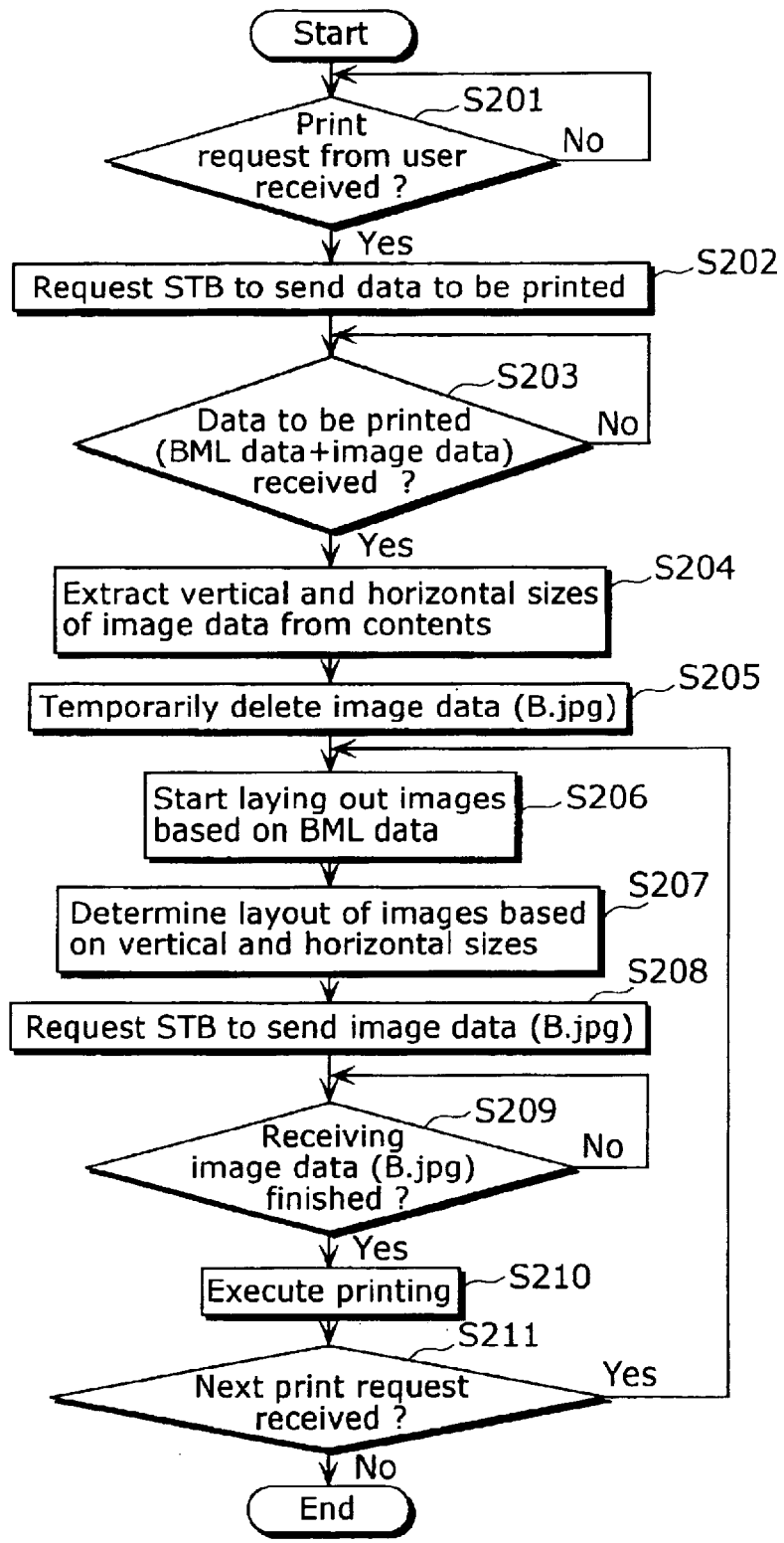
FIG. 5 is a flow chart showing the processing flow of the printer in the first embodiment.

FIG. 5 is a flow chart showing the processing flow in the printer 200 when executing printing explained in the above-mentioned FIG. 4.

When there is a print request from a user (S201), the printer 200 makes a send request for print data to the STB 100 (S202) first and receives the print data (such as BML data and image data) (S203).

Next, the printer 200 extracts the vertical and horizontal sizes of these images based on the image data and deletes the image data themselves because the memory capacity is limited.

Further, the printer 200 determines the layout for printing based on BML data and the above-mentioned vertical and horizontal sizes (S206 and S207), and makes a send request for the image data to the STB 100 (S208).

After this, the printer 200 receives the printing data from the STB 100, completes the image data for printing and executes printing the first page (S210).

Pages from the second page are printed in a same manner. (S211 and S206 to S210).

The processing method mentioned above makes it possible to print data that requires plural pages even when data that are not transformed into files written in a control language (more specifically, "Sample. bml", "A. jpg" and "B. jpg") are inputted and reduce the processing workload of apparatuses to be connected to the printer because complicated data processing in the image data sending side, that is, the STB 100 becomes unnecessary. Also, there is no need to write the descriptions of "A. jpg" and "B. jpg" whose data sizes are big in files written in a control language while an instruction specifying these file names should be written in files written in a control language because the printer 200 makes both of files written in a control language and object images. By doing this, it is possible to use the decompression buffer 203b effectively in the printer 200, and further, it is also possible to use the input file buffer 203a effectively by storing only the necessary image data in the input file buffer 203a only when the need arises.

An example of the STB 100 as the sending side of image data is explained in the above-mentioned embodiment, it is also possible to connect the printer 200 to a mobile device such as a mobile phone or the like and receive image data from an external data server via the mobile device.

Also, via an information electrical apparatus such as a microwave oven or a refrigerator with a storage medium such as an SD memory, it is possible to receive data stored in the storage unit of an apparatus of those listed above. When these apparatuses without a function for a complicated processing have a data send function, it becomes possible to print print data in the same method as in this embodiment. Further, while a BML file is used as a standard for making files written in a control language in the above-mentioned embodiment, a file written in an ML (Markup Language) such as an HTML file, an XHTM file and an XML file or any other file can also be used on condition that the file includes standard information of the file components.

The print data is explained as data displayed on a television display screen in this embodiment, but invisible data that are not displayed on a screen display are included when the data can be scrolled. For example, print data can be the data such as cooking recipe information that are not displayed on the television screen in a cooking program. When there is a description for linking to data except these visible data such as audio data in the standard information of the file structure, it is advisable to execute the processing for removing the linking to these visible data when making files written in a control language.

An example of writing link information in files to be written in a control language using file names of these image data is shown as to image data in this embodiment. On the other hand, the following is an explanation on the processing in the case where another standard file existing as a slave of a master standard file that is a standard for making files written in a control language. The name of the slave standard file is written as link information in a file written in a control language when transforming the master standard file into a control language. It is possible to execute the processing of printing the whole print data like this embodiment when transforming the slave standard file into a control language by executing the processing according to the contents of the contents of the slave standard file like this embodiment—for example, writing text data in a control language as they are, writing file names of image data as link destinations in a control language, and making OI and image data according to the instructions written in a control language that is made here.

Also, while files written in a control language are directly made from data stored in the input file buffer 203a in the above-mentioned embodiment, it is also possible to make files written in a control language after transforming the data into another format once.

In addition, the printing processing can be terminated without confirming the end of printing after printing the last page. Also, it is advisable to notify the STB 100 of a print termination message each time a printing processing terminates. Also, notifying the STB 100 of a print termination message each time a printing terminates enables the STB to keep a start instruction in another printing processing on hold, which makes it possible to avoid a collision of a resend instruction in the process of a printing and the start instruction in the printing processing.

Printing is executed in the order of pages starting from the 1st page in this embodiment, it is desirable that printable pages be displayed to a user when there are plural pages, the user can select the pages to be printed, and that printing in no particular order, for example, printing the fifth page next to the third page be possible. Also, the storage unit 203 is clearly divided into the input file buffer 203a, the decompression buffer 203b, the OI buffer 203c and the image data buffer 203d, but it is possible to regard the whole storage unit 203 as a memory instead of dividing it physically. For example, it is possible to reduce receiving times by preparing a bigger buffer area for an input file when the decompression buffer 203b has a free space.

(Second Embodiment)

Next, a printing system in the second embodiment of the present invention will be explained.

In this embodiment, the case where the vertical and horizontal sizes of image data are extracted from its header, layout for printing is performed, the entity data of the images necessary for printing is obtained, and printing is executed will be explained while the above-mentioned first embodiment is shown as the case where the part of the print data (more specifically, "B. jpg") is temporally deleted and the layout for printing is performed, and then the print data is reobtained and printed when it is judged whether the image data received from an STB can be stored in the input file buffer or not and the result is "impossible".

Figure 11:
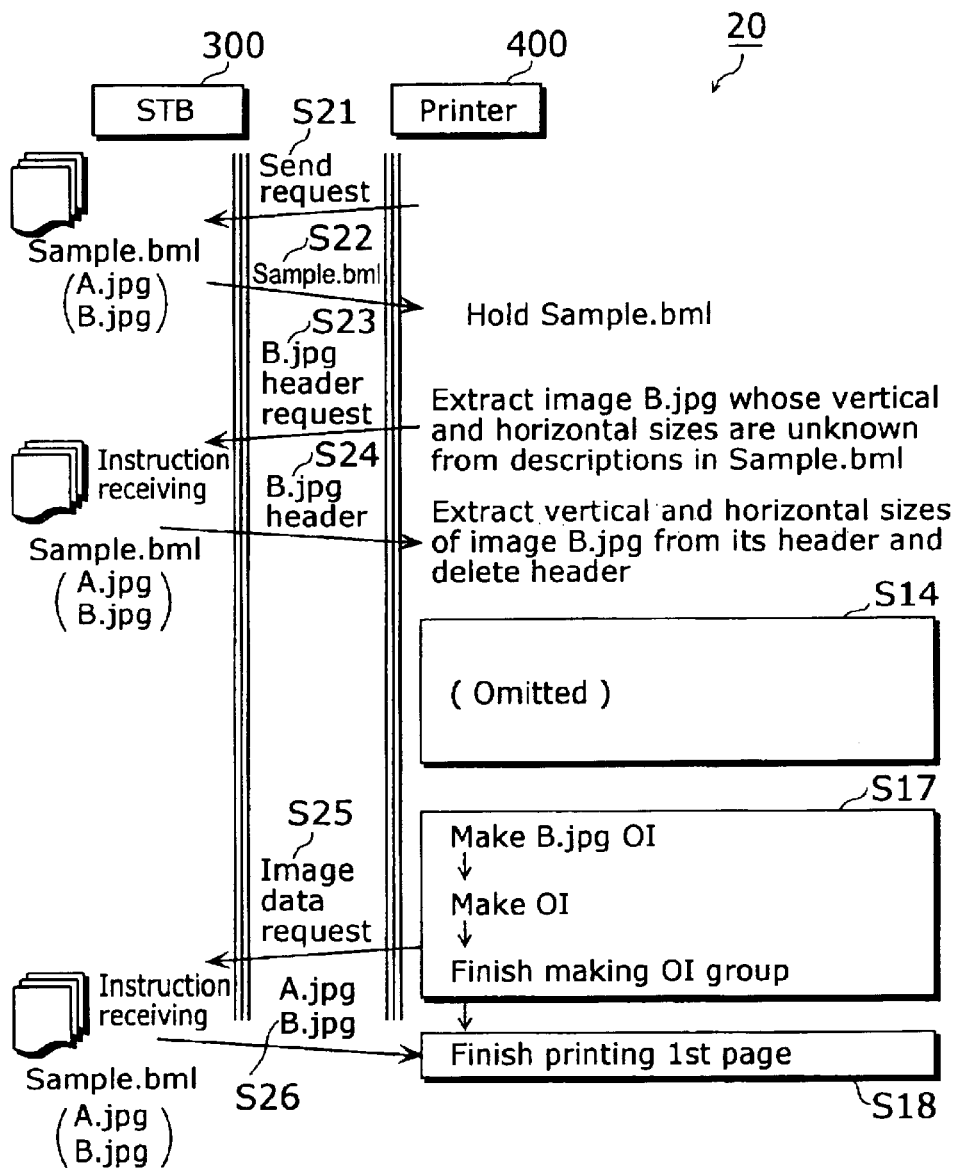
FIG. 11 is a communication sequence diagram showing the data communication between an STB and a printer in a second embodiment.

FIG. 11 is a diagram showing a communication sequence indicating the data communication between the STB 300 and the printer 400 that consist the printing system 20 concerning this embodiment.

The STB 300 has the same level functions as the STB 100 in the above-mentioned first embodiment, but the STB 300 differs from the above-mentioned STB 100 in that the STB 300 is useful when the printer 400 makes a send request for only the header of image data.

The printer 400 has the same level functions as the printer 200 in the above-mentioned first embodiment, but the printer 400 differs from the printer 200 in that the printer 400 makes a send request for only the header of image data to the STB 300.

Units different from the ones in the printing system in the above-mentioned first embodiment will be focused on in the following explanation, while the same reference number is given to the units used in common and explanations on those units are omitted.

As shown in FIG. 11, the printer 400 receives only "Sample. bml" from the STB 300 first (S21 and S22), and extracts image files whose vertical and horizontal sizes are unknown (such as "B. jpg") of "Sample. bml".

Next, the printer 400 obtains the header of "B. jpg" whose vertical and horizontal sizes are unknown from the STB 300 (S22 and S24). The printer 400 may delete the header of "B. jpg" after extracting the vertical and horizontal sizes of "B. jpg" from the header of "B. jpg". Next, the layout for printing is performed (S14 and S17) like the case of the above-mentioned first embodiment.

After that, the printer 400 obtains "A. jpg" and "B. jpg" from the STB 300 as the need arises (S25 and S26), and making image data for printing and executing printing (S18).

Figure 12:
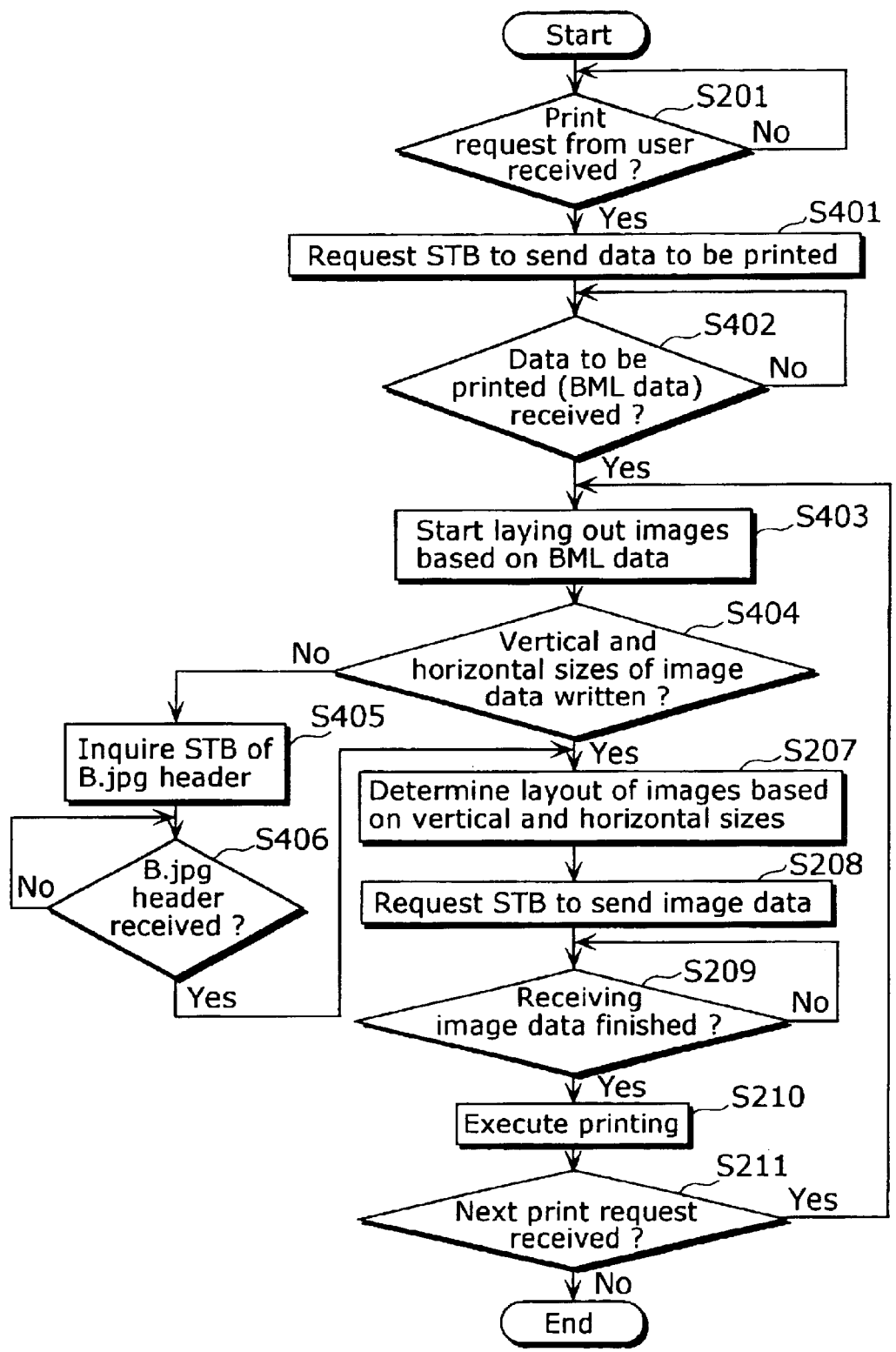
FIG. 12 is a flow chart showing the processing flow of the printer in a second embodiment.

FIG. 12 is a flow chart showing the processing flow in the printer 400 in this embodiment.

First, the printer 400 requests the STB 300 for only "Sample. bml" as print data and obtains "Sample. bml" (S401 and S402).

Next, the printer 400 starts laying out object images based on "Sample. bml" (S403), and checks whether the vertical and horizontal sizes of image data are written (S404). When the vertical and horizontal sizes are not written in "Sample. bml" (S404: No), the printer 400 obtains the header of "B. jpg" from the STB 300 (S405).

In this way, the printer 400 extracts the vertical and horizontal sizes from the header of "B. jpg" and completes laying out object images for printing (S207). Next, printing is executed (S208 to S211) like the case of the above-mentioned first embodiment.

As mentioned up to this point, the printing system 20 in this embodiment makes it possible to print images on a digital television screen and the like even when the buffer capacity for printing in the printer is small because the header in which the vertical and horizontal sizes necessary for laying out object images are preobtained from the STB, the layout for printing is completed, and then, necessary image data is received from the STB, and print image data are generated in advance.

(Third Embodiment)

Next, a printing system in the third embodiment of the present invention will be explained.

In this embodiment, the case where the layout for printing is performed after the vertical and horizontal sizes are obtained from the STB, the entity data of images necessary for printing is obtained, and printing is performed is explained, while the above-mentioned first embodiment is shown as the case where whether the image data received from the STB can be stored in the input file buffer is judged, when the judgment is "impossible", part of the print data (more specifically, "B. jpg") is temporarily deleted, layout for printing is performed, the print data is reobtained, and then printing is performed.

Figure 13:
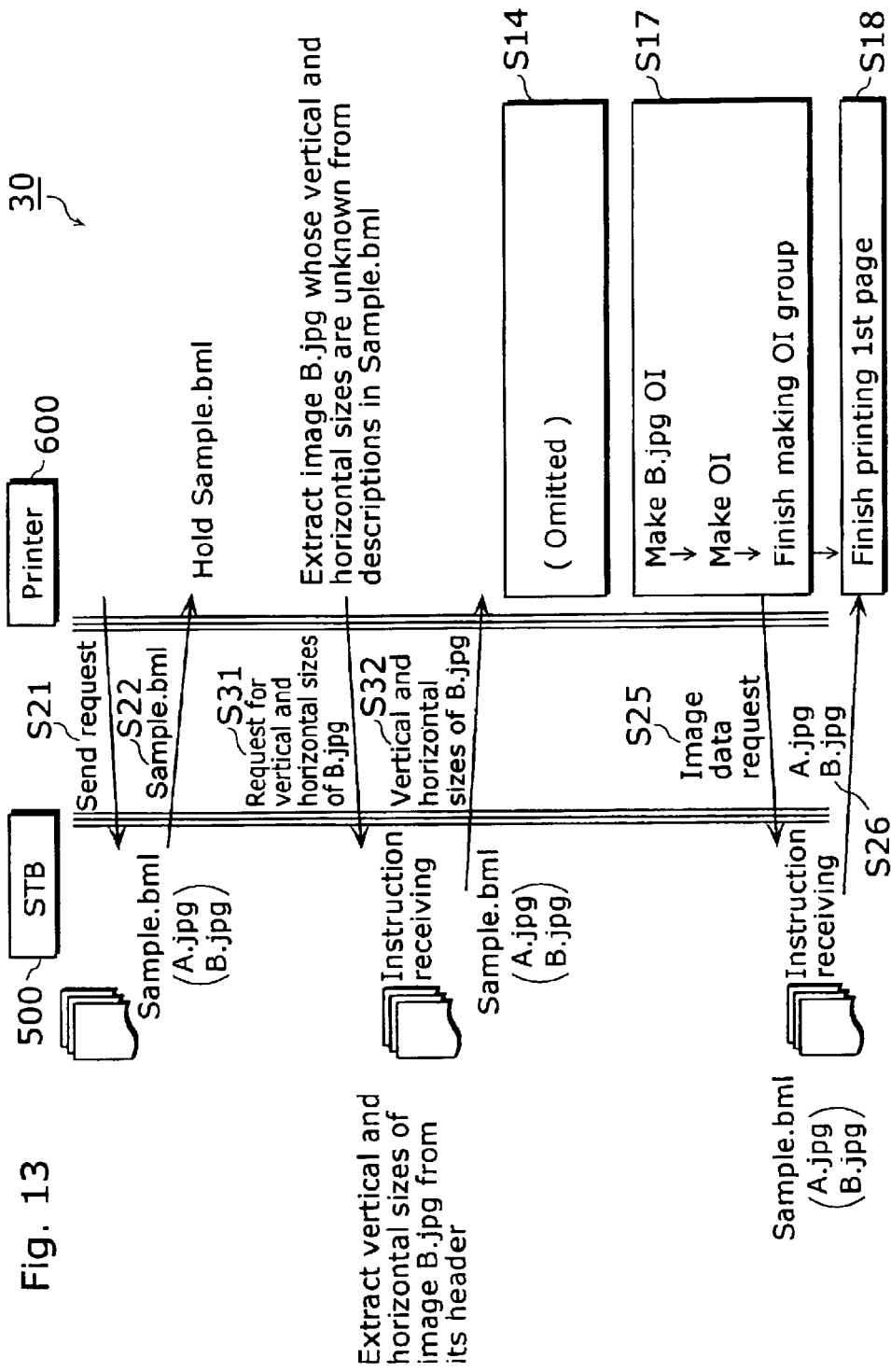
FIG. 13 is a communication sequence diagram showing the data communication between an STB and a printer in a third embodiment.

FIG. 13 is a communication sequence diagram showing the data communication between the STB 500 and the printer 600 that constitute the printing system 30 concerning this embodiment.

The STB 500 has the same level functions as the STB 100 in the above-mentioned first embodiment, but the STB 500 differs from the above-mentioned STB 100 in that the STB 500 is useful when there is a send request for only the vertical and horizontal sizes of image data made by the printer 600.

The printer 600 has the same level functions as the printer 200 in the above-mentioned first embodiment, but the printer 600 differs from the printer 200 in that the printer 600 makes a send request for only the vertical and horizontal sizes of image data to the STB 500.

Units different from the ones in the printing system in the earlier-mentioned embodiment will be focused on in the following explanation, while a same reference number is given to the units used in common and explanations on those units are omitted.

As shown in FIG. 13, the printer 600 extracts image files whose vertical and horizontal sizes are unknown (such as "B. jpg") of "Sample. bml" and receives only the vertical and horizontal sizes (for example, of "B. jpg") from the STB 500 after extracting the images whose vertical and horizontal sizes are unknown (S31 and S32).

The layout is made like the case in the above-mentioned second embodiment (S14 and S17) and printing is performed (S25, S26 and S18) below.

Figure 14:
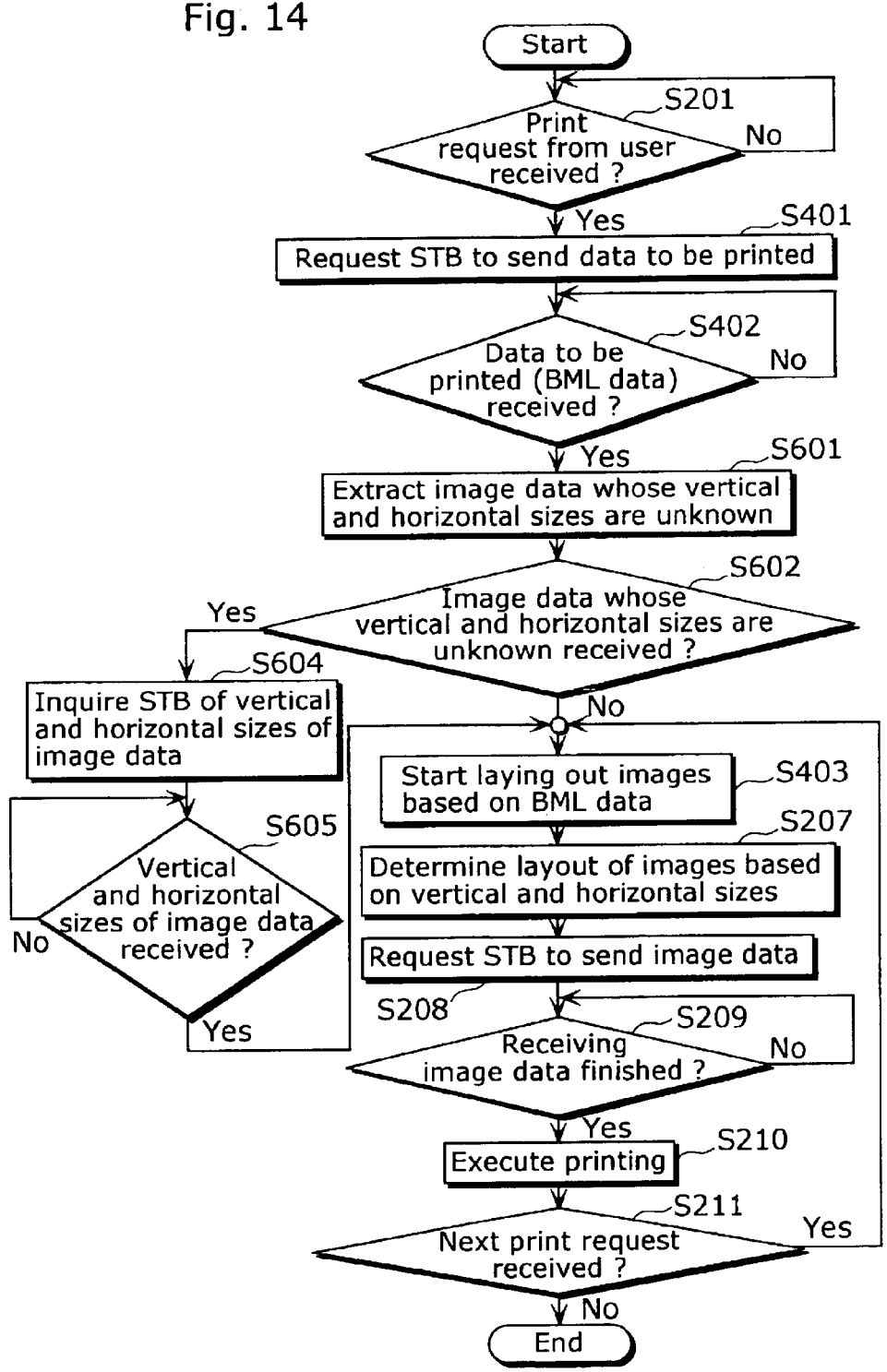
FIG. 14 is a flow chart showing the processing flow of the printer in the third embodiment.

FIG. 14 is a flow chart showing the processing flow in the printer 600 in this embodiment.

First, the printer 600 obtains only "Sample. bml" in the same manner as the above-mentioned second embodiment (S201, S401 and S402). Next, the printer 600 extracts images whose vertical and horizontal sizes are unknown (S601) based on "Sample. bml", and obtains only the vertical and horizontal sizes of these images from the STB 500 (S604 and S605).

The printer 400 completes the layout for printing (S403 and S207) as the vertical and horizontal sizes of all the images are clarified by these steps.

Printing is performed in the same manner as the above-mentioned second embodiment (S208 to S211).

As mentioned up to this point, the printing system 30 in this embodiment makes it possible to print a digital television screen and the like even when the buffer capacity for printing in the printer is small because the vertical and horizontal sizes necessary for the layout are obtained from the STB, the layout for printing is completed, and then, the necessary image data is received from the STB, and print image data are generated in advance.

(Fourth Embodiment)

Next, a printing system in the fourth embodiment of the present invention will be explained.

In this embodiment, the case where a server which is an image data sending source sends image data to which the vertical and horizontal sizes of the images are added in advance to the STB and the processing concerning the vertical and horizontal sizes executed between the STB and the printer is unnecessary will be explained, while the above-mentioned first embodiment is shown as the case where whether the image data received from the STB can be stored in the input file buffer is judged, when the judgment is "impossible", part of the print data (more specifically, "B. jpg") is temporarily deleted, the layout for printing is performed, the print data is reobtained, and printing is performed.

Figure 15:
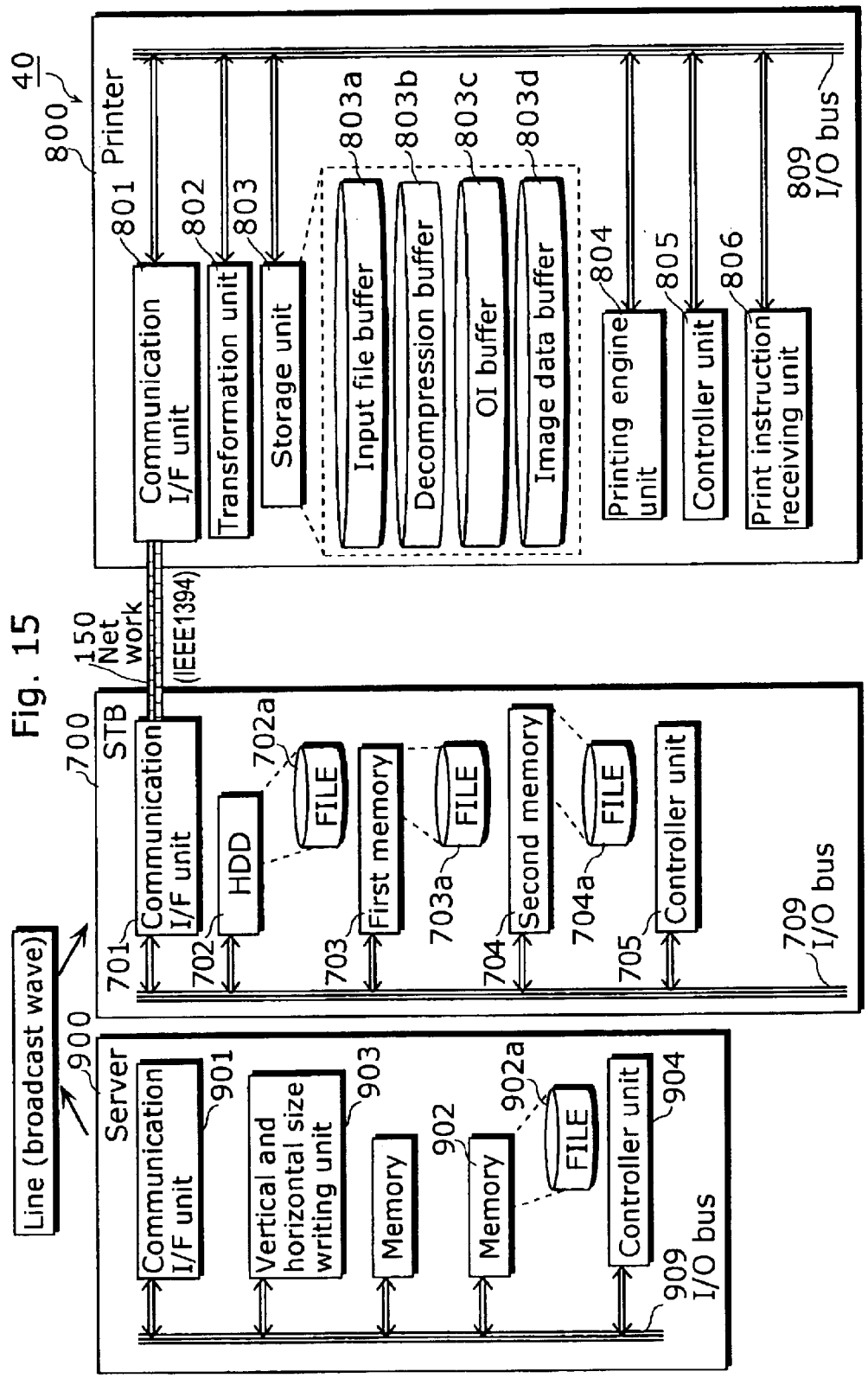
FIG. 15 is a block diagram showing the functional structure of a server, an STB and a printer comprise the printing system in a fourth embodiment.

FIG. 15 is a block diagram showing the functional structure of the server 900, the STB 700 and the printer 800 that constitute the printing system 40 in the fourth embodiment. Units different from the ones in the printing system in the above-mentioned embodiments will be focused on in the following explanation, while the same reference number is given to the units used in common and explanations on those units are omitted.

The server 900 has the communication I/F unit 901 operable to exchange data and so on when communicating with the STB 700, the memory 902 operable to store an HDD (hard disc drive) and the like for storing data and the like to be sent to the STB 700, the vertical and horizontal size writing unit 903 operable to specify the vertical and horizontal sizes of images in advance and write those sizes in "Sample. bml", and the controller unit 904 operable to control the above-mentioned respective units, all of which are connected with the I/O bus 909.

The communication I/F unit 701 in the STB 700 executes data transformation and so on when communicating with the server 900 and the printer 800.

The communication I/F unit 801 in the printer 800 executes data transformation and so on when communicating with the STB 700. Other units are the same as the ones in the above-mentioned first embodiment.

Figure 16:
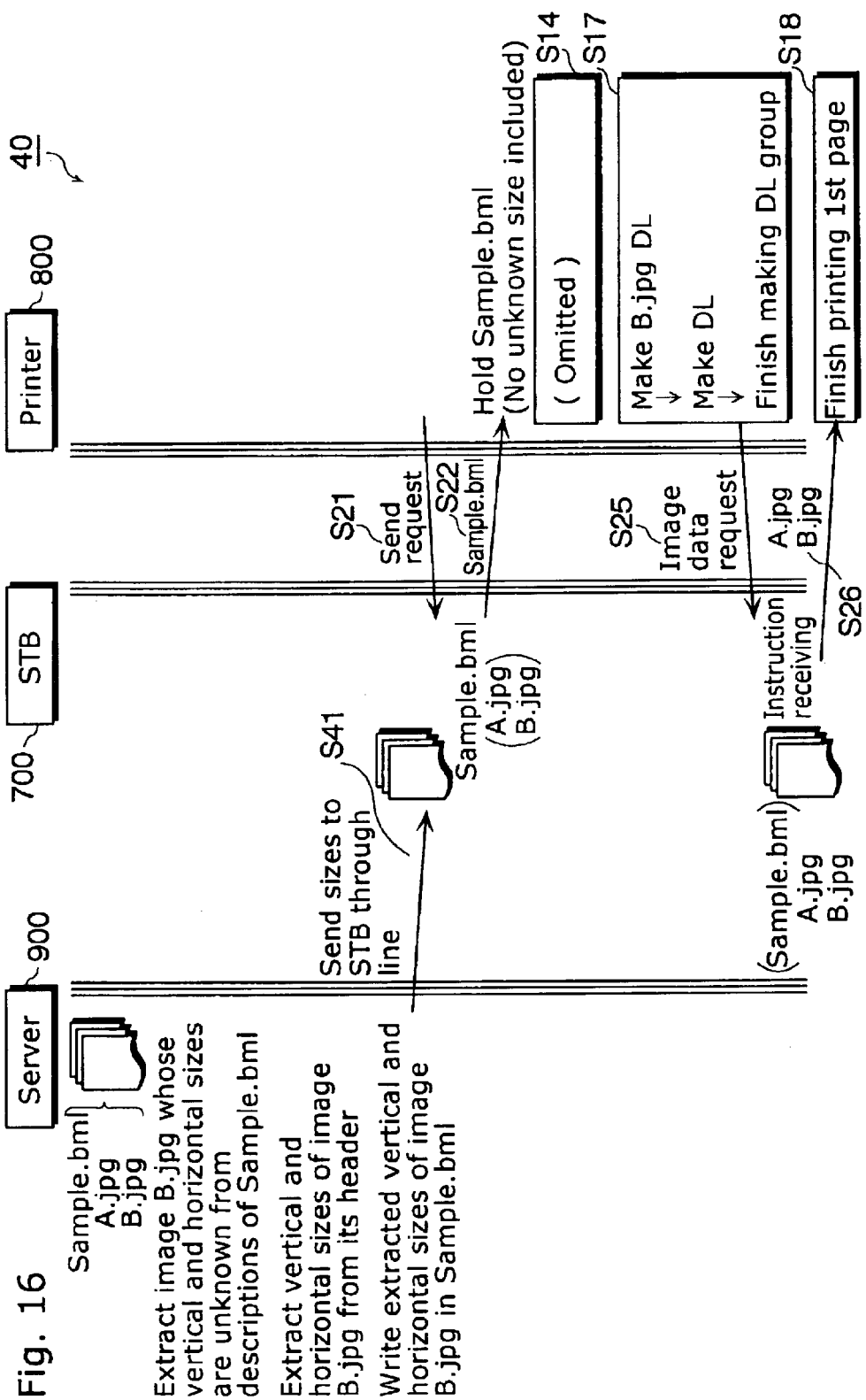
FIG. 16 is a communication sequence diagram showing the data communication among the server, the STB and the printer in the fourth embodiment.

FIG. 16 is a communication sequence diagram showing the data communication between the above-mentioned server 900, the STB 700 and the printer 800. As shown in FIG. 16, the vertical and horizontal size writing unit 903 in the server 900 judges whether the vertical and horizontal sizes of these images in the respective image files that comprise the display screen are written in "Sample. bml", as to the written image files, specifies the vertical and horizontal sizes with reference to the headers of these image files and writes those sizes in "Sample. bml".

The STB 700 receives print data from the server 900 via a line or a broadcasting wave (S41) and stores the data in the HDD 102. The printer 800 obtains only "Sample. bml" from the STB 700 (S21 and S22) in the same manner as the above-mentioned third embodiment, and performs the layout for printing based on the vertical and horizontal sizes of the respective images written in this "Sample. bml". The following communication sequence is the same as the above-mentioned third embodiment.

Figure 17:
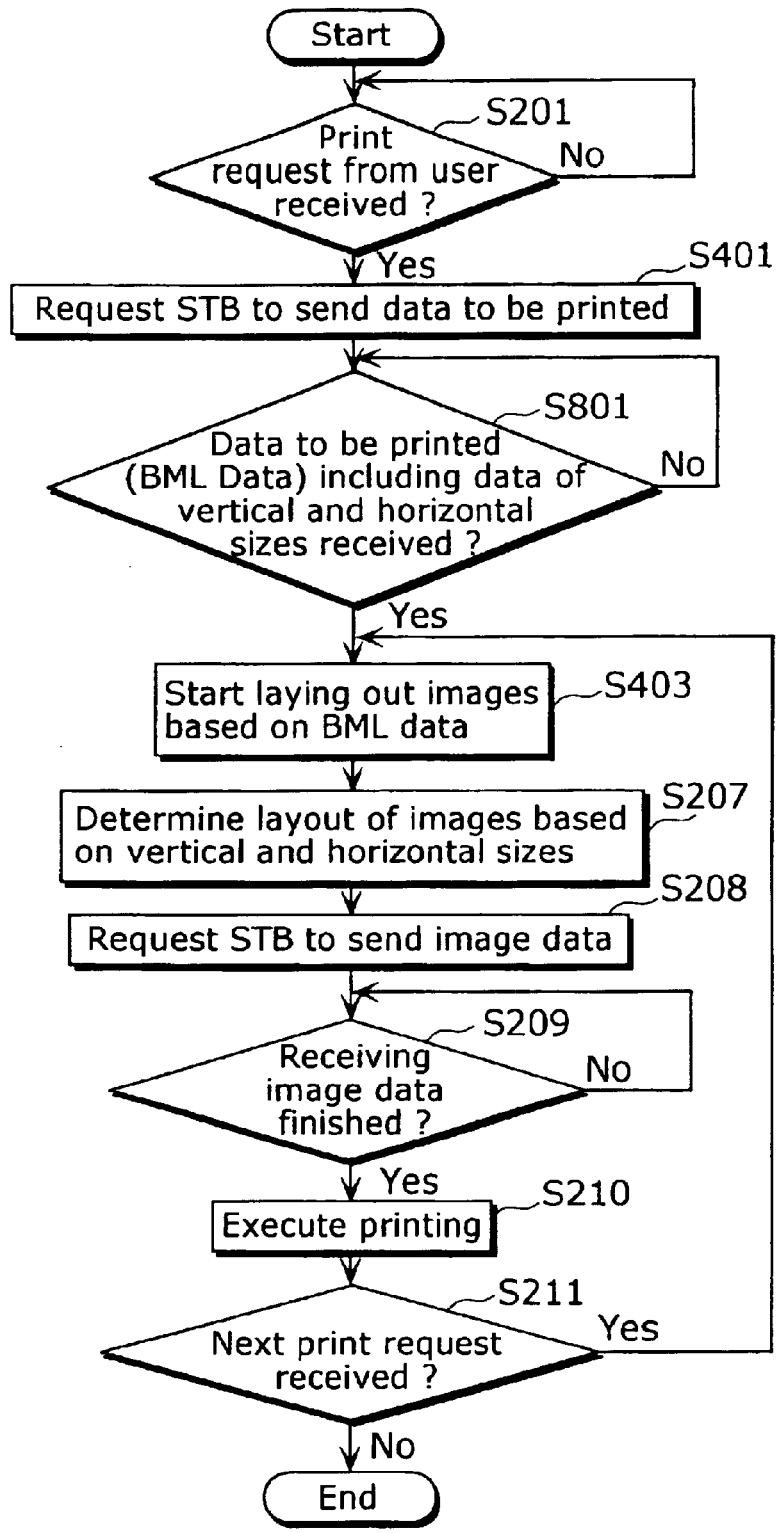
FIG. 17 is a flow chart showing the processing flow of the printer in the fourth embodiment.

FIG. 17 is a flow chart showing the processing flow in the printer 800 in this embodiment.

First, the printer 800 obtains only "Sample. bml" like the case of the above-mentioned third embodiment (S201, S401 and S402). Next, the printer 800 completes laying out of all the images necessary for printing (S403 and S207) based on "Sample. bml" and next, executes printing in the same manner as the third embodiment (S208 to S211).

As mentioned up to this point, the printing system 40 in this embodiment makes it possible to reduce the time needed for printing because the necessary vertical and horizontal sizes are specified in a server and written in "Sample. bml" in advance and thus there is no need to communicate data for specifying the vertical and horizontal sizes after that.

Industrial Applicability

As mentioned up to this point, the printing apparatus and the printing method in the present invention is suitable for a printing system in a digital television and the like that can realize reduction in the memory cost and acceleration in printing speed because the memory capacity needed for printing is smaller, and data communication is performed more efficiently than before when printing the images displayed on a digital television or the like.

What is claimed is:

1. A printing apparatus used in a printing system, the printing apparatus being connected with a content storage device,
wherein the content storage device stores contents including image data that is used for representing an image, text data that is used for representing text and data indicating vertical and horizontal sizes of the image, and sends, to the printing apparatus in response to a request from the printing apparatus, at least one of (i) a content part relating to the image data, (ii) a content part relating to the text data, and (iii) a content part relating to the data indicating the vertical and horizontal sizes of the image,
the printing apparatus comprising:
a data obtainment unit operable to obtain, from the content storage device, a part of data of the contents, the part of data being data other than image data that is used for representing an image, the contents including the image data , the text data, and other data;
a size obtainment unit operable to analyze the obtained contents and obtain vertical and horizontal sizes of the image based on the analysis;
a layout unit operable to lay out the text for printing, and to lay out the image for printing using the obtained vertical and horizontal sizes;

an image obtainment unit operable to obtain the image data from content storage device based on the layout; and a printing unit operable to generate print image data based on the obtained image data and the layout, and print out the image data.

2. A printing apparatus according to claim 1, wherein the contents includes component information on components of the contents, wherein the data obtainment unit obtains the component information included in the contents, and wherein the size obtainment unit obtains the vertical and horizontal sizes from the obtained component information.

3. A printing apparatus according to claim 2, wherein the contents includes a header part and a body part, and the header part includes data indicating the vertical and horizontal sizes, wherein the data obtainment unit obtains the header part of the contents, and wherein the size obtainment unit obtains data indicating the vertical and horizontal sizes included in the obtained header part.

4. A printing apparatus according to claim 1, wherein the data obtainment unit comprises:

a storage unit operable to store obtained contents;

a judgment unit operable to judge whether the obtained contents can be stored in the storage unit or not; and a deletion unit operable to delete a part of the data of the contents when the judgment unit judges that the obtained contents cannot be stored; and a data reobtainment unit operable to reobtain the part of the deleted contents as a need arises.

5. A printing apparatus according to claim 1, wherein the contents includes a header part and a body part, and the header part includes data indicating the vertical and horizontal sizes, wherein the data obtainment unit obtains the header part of the contents, and wherein the size obtainment unit obtains data indicating the vertical and horizontal sizes included in the obtained header part.

6. A printing apparatus according to claim 5, wherein the data obtainment unit obtains only data indicating the vertical and horizontal sizes in the header part, the obtained data showing the vertical and horizontal sizes being regarded as the obtained vertical and horizontal sizes.

7. A printing apparatus according to claim 6, further comprising a storage unit operable to store data, wherein the storage unit holds data indicating the component information until the layout is completed.

8. A printing apparatus according to claim 7, wherein the storage unit further stores data indicating the vertical and horizontal sizes.

9. A printing apparatus according to claim 8, wherein the data indicating the component information is data written in a markup language.

10. A printing apparatus according to claim 9, wherein the data written in the markup language is data written in Broadcast Markup Language.

11. A content output apparatus for outputting contents including image data to a printing apparatus, wherein the contents includes image data that is used for representing the image, text data that is used for representing text, and data indicating vertical and horizontal sizes of the image, wherein the content output apparatus sends, to the printing apparatus in response to a request from the printing apparatus, at least one of (i) a content part relating to the image data (ii) a context part relating to the text data, and (iii) a content part relating to the data indicating the vertical and horizontal sizes of the image, wherein the contents include a header part and a body part, and the header part includes data indicating the vertical and horizontal sizes, and wherein the content output apparatus obtains the header part from the contents, and sends the header part to the printing apparatus.

12. The content output apparatus for outputting contents including image data to a printing apparatus according to claim 11, wherein the contents include a header part and a body part, and the header part includes data indicating the vertical and horizontal sizes, and wherein the content output apparatus obtains the vertical and horizontal sizes from the header part and sends the vertical and horizontal sizes to the printing apparatus.

13. A printing method for a printing apparatus used in a printing system, the printing apparatus being connected to a content storage device, wherein the content storage device stores contents including image data that is used for representing an image, text data that is used for representing text, and data indicating vertical and horizontal sizes of the image, and sends, to the printing apparatus in response to a request from the printing apparatus, at least one of (i) a content part relating to the image data, (ii) a content part relating to the text data and (iii) a content part relating to the data indicating the vertical and horizontal sizes of the image, the printing method comprising:

a data obtainment step of obtaining, from the content storage device, a part of data of the contents, the part of data being data other than image data that is used for representing an image, the contents including the image data, the text data, and other data;

a size obtainment step of analyzing the obtained contents and obtaining vertical and horizontal sizes of the image based on the analysis;

a layout step of performing a layout of the text for printing, and performing a layout of the image for printing the obtained vertical and horizontal sizes;

an image obtainment step of obtaining the image data from the content storage device based on the layout; and a printing step of generating print image data based on the obtained image data and the layout and printing out the data.

14. The printing method according to claim 13, wherein the contents includes component information that is information on components of the contents, wherein in the data obtainment step, the component information included in the contents is obtained, and wherein in the size obtainment step, the vertical and horizontal sizes are obtained from the obtained component information.

15. The printing method according to claim 14, wherein the image data includes a header part and a body part, and the header part includes data indicating the vertical and horizontal sizes, wherein in the data obtainment step, the header part of the image data is obtained, and wherein the size obtainment step, data showing the vertical and horizontal sizes included in the obtained header part is extracted.

16. The printing method according to claim 13, wherein the data obtainment step comprises:

a storage sub-step of storing obtained contents;

a judgment sub-step of judging whether the obtained contents can be stored in the storage unit or not; and a deletion sub-step of deleting a part of the data of the contents when the judgment unit judges that the obtained contents cannot be stored; and a data reobtainment sub-step of reobtaining the part of the deleted contents as a need arises.

17. The printing method according to claim 13, wherein the image data includes a header part and a body part, and the header part includes data indicating the vertical and horizontal sizes, wherein in the data obtainment step, the header part of the image data is obtained, and wherein in the size extraction step, data showing the vertical and horizontal sizes included in the obtained header part is extracted.

18. The printing method according to claim 17, wherein in the data obtainment step, only data showing the vertical and horizontal sizes in the header part is obtained, and wherein in the size extraction step, the obtained data showing the vertical and horizontal sizes being regarded as the extracted vertical and horizontal sizes.

19. A printing system comprising a content output apparatus and a printing apparatus, wherein the content output apparatus stores contents including image data that is used for representing an image, text data that is used for representing text, and data indicating vertical and horizontal sizes of the image, and sends, to the printing apparatus in response to a request from the printing apparatus, at least one of (i) a content part relating to the image data, (ii) a content part relating to the text data and (ii) a content part relating to the data indicating the vertical and horizontal sizes of the image, the printing apparatus comprising:

a data obtainment unit operable to obtain, from the content output apparatus, a part of data of the contents, the part of data being the data other than image data that is used for representing an image, the contents including the image data, the text data and other data;

a size obtainment unit operable to analyze the obtained contents and obtain vertical and horizontal sizes of the image based on the analysis;

a layout unit operable to lay out text for pringting, and to lay out the image for printing using the obtained vertical and horizontal sizes;

an image obtainment unit operable to obtain the image data from the content output apparatus based on the layout; and a printing unit operable to generate print image data based on the obtained image data and the layout and print out the print image data.

* * * * *

UNITED STATES PATENT AND TRADEMARK OFFICE
CERTIFICATE OF CORRECTION

PATENT NO.        : 7,077,586 B2
APPLICATION NO. : 10/487275
DATED             : July 18, 2006
INVENTOR(S)       : Kenji Hisatomi It is certified that error appears in the above-identified patent and that said Letters Patent is hereby corrected as shown below:

ON THE TITLE PAGE

Under Foreign Patent Documents, please add --JP  11-175425  7/1999--.

In the abstract, line 5, please replace ""Sample. bml"" with -- "Sample.bml"--.

IN THE CLAIMS

In column 12, line 62, please replace "data , the" with --data, the--.

In column 13, line 2, please replace "from content" with --from the content--.

In column 14, line 8, please replace "image data (ii)" with --image data, (ii)--.

In column 14, line 8, please replace "context" with --content--.

In column 14, line 50, please replace "printing the obtained" with --printing using the obtained--.

In column 14, line 55, please replace "layout and" with --layout, and--.

In column 15, line 7, please replace "wherein the size obtainment step" with --wherein in the size obtainment step--.

In column 16, line 13, please replace "text data and (ii) a content" with --text data, and (iii) a content--.

In column 16, line 25, please replace "to lay out text for pringting, and" with --to lay out the text for printing, and--.

In column 16, line 32, please replace "layout and print out" with --layout, and print out--.

UNITED STATES PATENT AND TRADEMARK OFFICE
CERTIFICATE OF CORRECTION

PATENT NO. : 7,077,586 B2
APPLICATION NO. : 10/487275
DATED : July 18, 2006
INVENTOR(S) : Kenji Hisatomi It is certified that error appears in the above-identified patent and that said Letters Patent is hereby corrected as shown below:

In column 16, line 32, please replace "layout and print out" with --layout, and print out--.

Signed and Sealed this

First Day of May, 2007

JON W. DUDAS
*Director of the United States Patent and Trademark Office*